US009728110B2

(12) United States Patent
Taylor et al.

(10) Patent No.: US 9,728,110 B2
(45) Date of Patent: Aug. 8, 2017

(54) PORTABLE EXHIBIT DISPLAY WITH MAGNETIC ACCESSORY MOUNTS

(71) Applicant: Vomela Specialty Company, St. Paul, MN (US)

(72) Inventors: Kelly Taylor, Roy, UT (US); Brandon Dart, Syracuse, UT (US); Erich Toomey, Kaysville, UT (US); Joe Covington, Bountiful, UT (US)

(73) Assignee: Vomela Specialty Company, St. Paul, MN (US)

( * ) Notice: Subject to any disclaimer, the term of this patent is extended or adjusted under 35 U.S.C. 154(b) by 0 days.

(21) Appl. No.: 15/151,560

(22) Filed: May 11, 2016

(65) Prior Publication Data

US 2016/0249750 A1 Sep. 1, 2016

Related U.S. Application Data

(63) Continuation of application No. 14/656,960, filed on Mar. 13, 2015, now Pat. No. 9,339,129.

(60) Provisional application No. 61/953,254, filed on Mar. 14, 2014.

(51) Int. Cl.
| | |
|---|---|
| *G09F 15/00* | (2006.01) |
| *A47F 5/10* | (2006.01) |
| *E04H 1/12* | (2006.01) |
| *A47F 5/00* | (2006.01) |
| *F16B 1/00* | (2006.01) |
| *E04B 2/74* | (2006.01) |

(52) U.S. Cl.
CPC .............. *G09F 15/00* (2013.01); *A47F 5/105* (2013.01); *E04H 1/1272* (2013.01); *A47F 5/0018* (2013.01); *E04B 2/7416* (2013.01); *E04B 2002/7483* (2013.01); *F16B 2001/0035* (2013.01)

(58) Field of Classification Search
CPC ........ G09F 15/00; E04H 1/1272; A47F 5/105; A47F 5/0018; A47G 5/00; E04B 2002/7483; E04B 2/7416; F16B 2001/0035
USPC ....................................................... 211/186
See application file for complete search history.

(56) References Cited

U.S. PATENT DOCUMENTS

| | | | |
|---|---|---|---|
| 3,017,036 A | | 1/1962 | Albert et al. |
| 3,827,019 A | * | 7/1974 | Serbu ...................... A41F 1/002 135/117 |
| 4,058,357 A | | 11/1977 | Wallace |
| 4,586,616 A | | 5/1986 | Cooper et al. |
| 4,658,560 A | | 4/1987 | Beaulieu |
| 5,417,397 A | | 5/1995 | Harnett |
| 5,746,329 A | | 5/1998 | Rondeau |
| 6,085,916 A | | 7/2000 | Kovacevic et al. |
| 6,658,697 B2 | | 12/2003 | Liao |
| 6,712,229 B2 | | 3/2004 | Fritsche |
| 7,024,834 B2 | | 4/2006 | Gimpel |

(Continued)

*Primary Examiner* — Korie H Chan

(74) *Attorney, Agent, or Firm* — Haugen Law Firm PLLP

(57) ABSTRACT

A portable exhibit display includes a frame and a fabric covering for tensioned securement to the frame, wherein the frame incorporates a plurality of first magnets defining magnetic attachment regions of a magnetic attachment array. An accessory provided with one or more attachment points attractive to the first magnets may be removably magnetically secured to the fabric covering in proximity to respective magnetic attachment regions of the magnetic attachment array.

18 Claims, 8 Drawing Sheets

(56) References Cited

U.S. PATENT DOCUMENTS

| | | | |
|---|---|---|---|
| 7,686,287 B2* | 3/2010 | Dixon | B23Q 1/32 269/20 |
| 7,744,328 B2 | 6/2010 | Jung et al. | |
| 3,056,572 A1 | 11/2011 | Livacich et al. | |
| 8,065,847 B2 | 11/2011 | Gimpel | |
| 8,146,872 B2* | 4/2012 | Koning | G09F 1/103 24/303 |
| 8,205,846 B2 | 6/2012 | Glunk | |
| 8,312,653 B2 | 11/2012 | Fritsche | |
| 8,458,937 B2 | 6/2013 | Fritsche | |
| 8,750,079 B2 | 6/2014 | Lagorgette | |
| 8,807,193 B2 | 8/2014 | Zarelius | |
| 8,879,149 B2 | 11/2014 | Kunze | |
| 8,895,859 B2* | 11/2014 | Koniers | H02G 7/00 174/135 |
| 8,943,723 B2 | 2/2015 | Valentine et al. | |
| 2005/0236347 A1 | 10/2005 | Cole | |
| 2010/0236116 A1 | 9/2010 | Gimpel et al. | |
| 2010/0275419 A1* | 11/2010 | Millus | A47G 21/167 24/306 |
| 2012/0044031 A1 | 2/2012 | Ninomiya | |
| 2012/0080891 A1* | 4/2012 | Bravo | E05C 17/443 292/251.5 |
| 2012/0119629 A1 | 5/2012 | Nelson | |
| 2013/0329287 A1 | 12/2013 | Zarelius | |
| 2014/0166215 A1* | 6/2014 | Thomas | A47H 2/00 160/38 |
| 2014/0252196 A1* | 9/2014 | Abady | A47B 19/002 248/447 |
| 2014/0311083 A1* | 10/2014 | Madril | E04H 12/347 52/741.14 |
| 2014/0358275 A1* | 12/2014 | Browne | A45C 13/1069 700/214 |
| 2015/0014260 A1 | 1/2015 | Lynch | |
| 2015/0060611 A1* | 3/2015 | Takahashi | B60L 11/00 248/70 |
| 2015/0208826 A1* | 7/2015 | Yang | E05B 73/0082 248/551 |

* cited by examiner

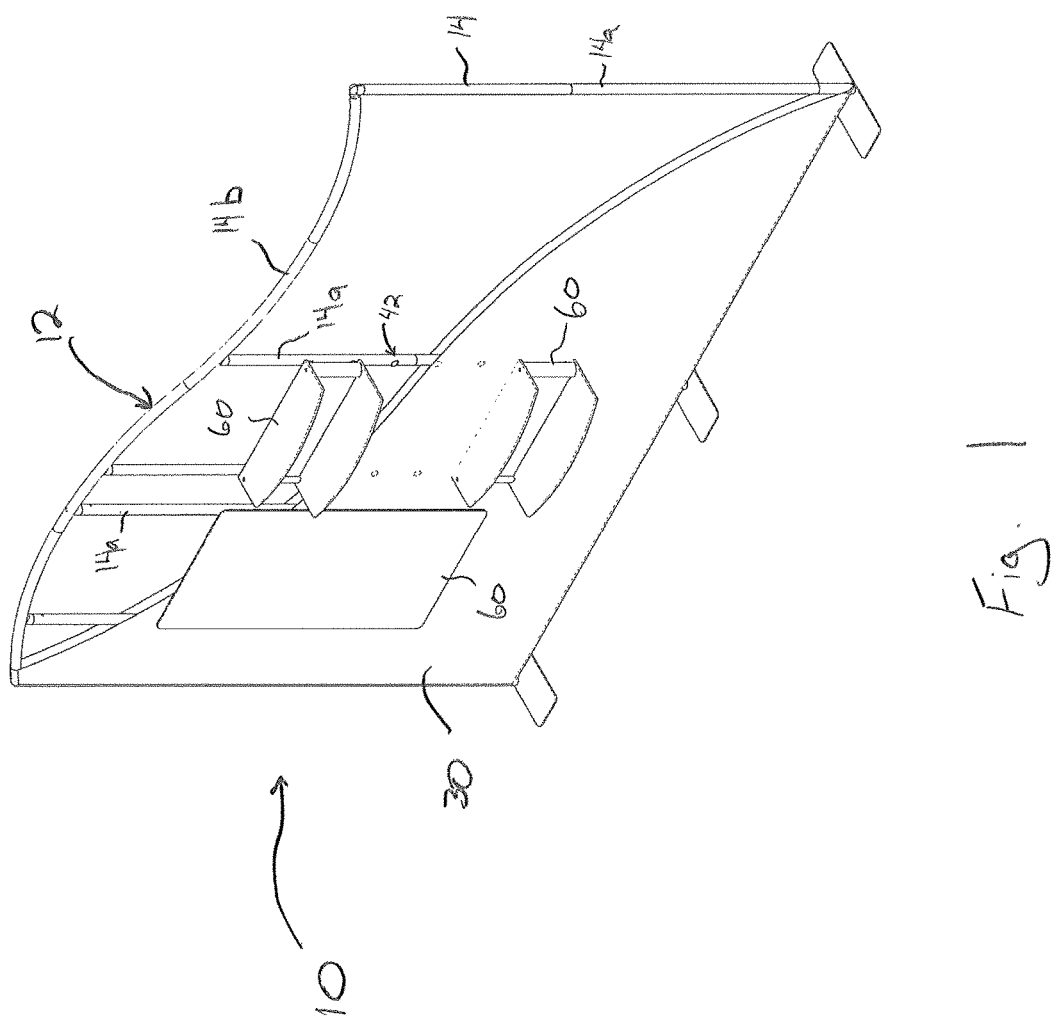

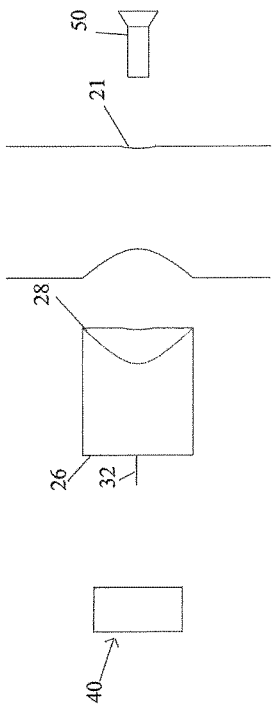
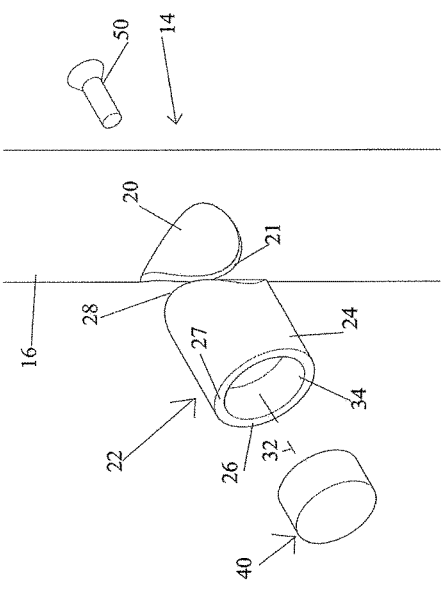
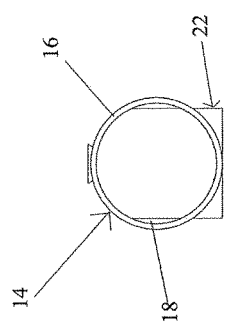
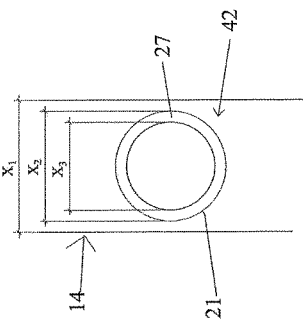

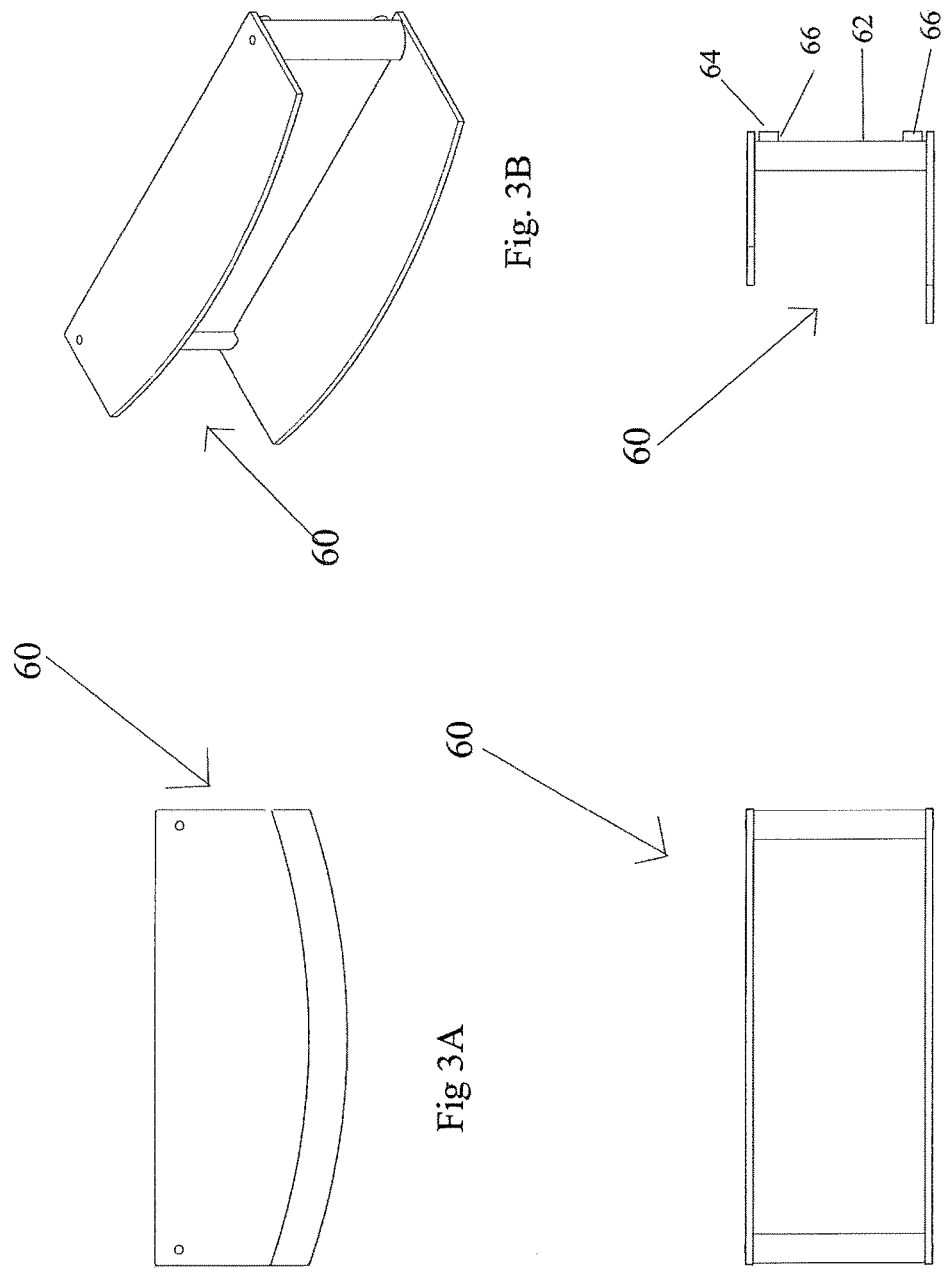

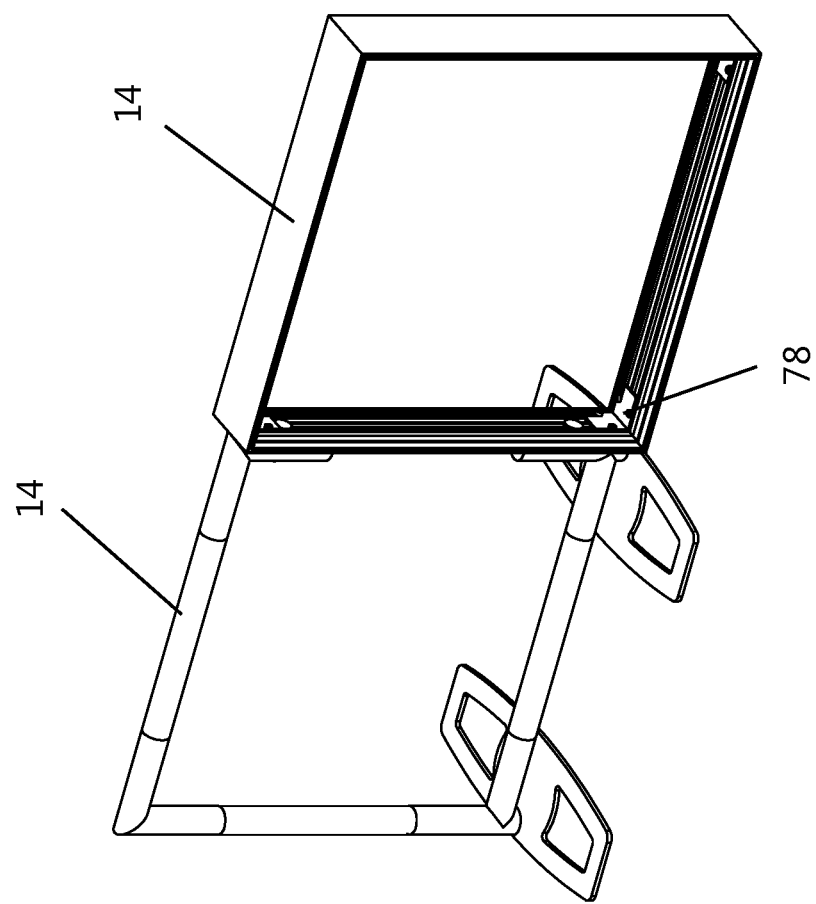

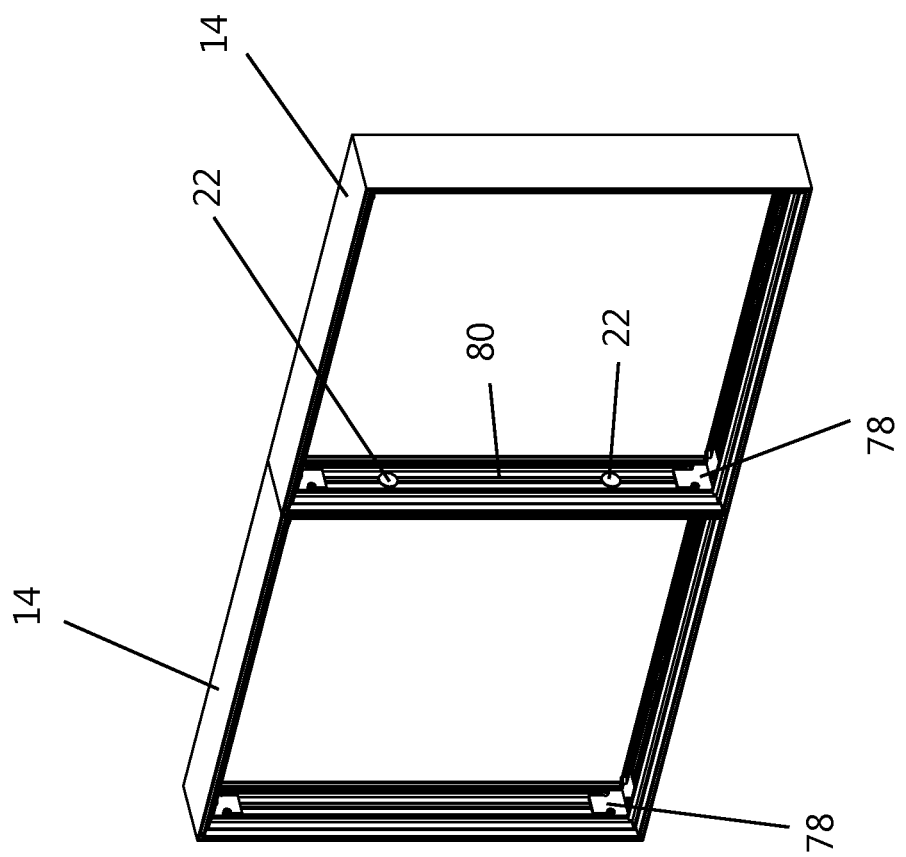

PORTABLE EXHIBIT DISPLAY WITH MAGNETIC ACCESSORY MOUNTS

CROSS-REFERENCE TO RELATED APPLICATIONS

This application claims priority to U.S. Provisional Patent Application Ser. No. 61/953,254, filed on Mar. 14, 2014 and U.S. patent application Ser. No. 14/656,960 filed on Mar. 13, 2015, the contents of which are being incorporated herein by reference in their entirety.

TECHNICAL FIELD

The present invention relates to portable exhibit displays generally, and more particularly to a tensioned fabric exhibit display having a magnetic attachment array for removably magnetically securing accessories to the tensioned fabric display.

BACKGROUND

Exhibit displays for meetings, trade shows, and other events are typically structures that may be easily transported and erected for the intended temporary usage. Such portable exhibit displays may commonly employ a network of interconnected frame members to form a support frame, and a fabric or modular covering connected to the support frame.

It is often advantageous to the purposes of the display to utilize accessories such as shelving, mounting brackets, and other items to highlight specific products, influence a particular audience, or for many other creative and aesthetic reasons. Securing such accessories to conventional exhibit displays, however, requires the use of mechanical fasteners that penetrate through the covering material to be anchored to the support frame. Accessory attachment with mechanical fasteners is time consuming and can aesthetically or structurally damage the fabric covering, which often times comprises expensive graphical materials. Puncturing of the covering material with mechanical fasteners may prevent the repeated use of the covering materials, which may be a significant added expense for portable exhibit displays.

Consequently, there is a need for a portable exhibit display that facilitates rapid attachment and detachment of accessories without damage to the covering material. There is further a need to provide the user with flexibility in placement of the accessories to the exhibit display, so as to custom-arrange promotional and/or instructional materials and exhibits.

SUMMARY

Embodiments according to aspects of the invention include accessories that may be simply and efficiently removably secured to a portable exhibit display to enhance the aesthetics and/or functionality of the display. Example accessories include shelving units, brackets, graphical displays, walls, accent lighting, and the like. Through the apparatus of the present invention, such accessories may be secured to the portable exhibit display without the need for separate mechanical fasteners, in contrast to conventional systems.

In one embodiment, the portable exhibit display of the present invention includes a frame having a plurality of interconnectable frame members each having a tubular side wall defining a chamber, wherein the frame members include an array of receptacles in the tubular side walls opening to the chamber. The portable exhibit display further includes a fabric covering for tensioned securement to the frame, and a plurality of fittings secured in respective receptacles. The fittings have first and second ends along a fitting axis, and include a cavity that opens to the first end. The fittings are positioned so as to be substantially contained at a respective chamber. The display of the present invention further includes a plurality of first magnets, each secured in the cavity of a respective fitting so as to be substantially coextensive with the first end of the fitting. The plurality of first magnets define magnetic attachment regions of a magnetic attachment array. An accessory having a rear surface including an attachment point with at least one of a metallic plate and a second magnet may be secured to the fabric covering in proximity to a respective magnetic attachment region through a magnetic attraction force to the first magnets at a respective magnetic attachment region.

In embodiments according to aspects of the invention the portable exhibit display includes at least one frame having a fabric covering that covers at least attachment points of the frame. The fabric is secured to the frame for tensioned securement. The display also includes one or more accessory that couples to the frame without the need for fastening tools. The frame also has a plurality of interconnectable frame members that comprise the frame. The frame members have hollow portions and receptacles that extend into the hollow portion from an external surface of the frame members. The frame members further having an array of receptacles that receive magnets within the receptacles formed in said frame members. The plurality of magnets are secured such that an outer portion of the magnets are substantially coextensive with an outer surface of said frame members and the plurality of magnets define magnetic attachment regions of the frame members of the frame. The accessory is removably magnetically securable at said magnetic attachment regions of the frame. The fabric conceals the receptacles and is sandwiched between the frame and the accessory proximate the magnetic attachment regions.

In embodiments of the invention the accessory of the portable exhibit display may have magnets that define a plurality of attachment points of the accessory. The accessory may be selected from the group consisting of a shelf, a graphical apparatus, a peg board, and a wall. Additionally, the accessory may be comprised of a second frame that has an array of receptacles and magnets defining corresponding magnetic attachment regions of the second frame. A second fabric covering covers at least a portion of the second frame. Alternatively, the accessory may be comprised of a three dimensional accessory having attachment points consisting of a metallic plate or magnetized fittings, wherein the attachment points are arranged on the accessory to align with the attachment regions of the frame.

In an embodiment according to aspects of the invention the magnets of the frame are substantially contained within fittings that are attached to the frame members within the receptacles. Alternatively, the magnets may be comprised of magnetized fittings that attach to the frame within the receptacles and align flush with an outer side of the frame members. These magnetized fittings define magnetic attachment regions along the frame. The accessory may also include magnetized fitting wherein the magnetized fittings of the frame and accessory have a sufficient magnetization to couple and retain the accessory to the frame with the portion of fabric covering of the frame sandwiched between the accessory and the frame.

In an embodiment according to aspects of the invention the portable exhibit display is comprised of a first frame and a second frame magnetically coupled together. The first frame has an array of magnets contained within corresponding receptacles of the first frame, wherein corresponding outer surfaces of the magnets are aligned flush with an outer surface of the first frame and the array of magnets defines a corresponding first magnetic attachment region. The first frame also has a first fabric covering that covers at least a portion of the first magnetic attachment region. Similarly, the second frame has an array of magnets contained within corresponding receptacles of the second frame, wherein corresponding surfaces of the magnets are aligned flush with an outer surface of the second frame and the array of magnets defines a corresponding second magnetic attachment region. The second frame has a second fabric covering that covers at least a portion of the second magnetic attachment region. The second frame is removably magnetically securable to the first frame and the first frame is removably magnetically securable to the second frame. Further, a portion of the first fabric covering and second fabric covering are sandwiched between the first frame and the second frame.

Each of the first and second frames may be comprised of interconnectable frame members. Further, magnetized swivel fittings may interconnect the frame members and a plurality of the magnetized swivel fittings may define the magnetic attachment region of each frame. The magnets and swivel fittings may be coupled to the frame in a manner so that the magnetized fittings have an outer surface that aligns flush with an outer side of each frame. Further, the magnetized fittings have a sufficient magnetization to couple and retain the first frame to the second frame.

The accompanying drawings, which are incorporated in and constitute a portion of this specification, illustrate embodiments of the invention and, together with the detailed description, serve to further explain the invention. The embodiments illustrated herein are presently preferred, however, it should be understood that the invention is not limited to the precise arrangements and instrumentalities shown. For a fuller understanding of the nature and advantages of the invention, reference should be made to the detailed description in conjunction with the accompanying drawings.

BRIEF DESCRIPTION OF THE DRAWINGS

FIG. 1 is a schematic partial cut-away view of a portable exhibit display of an embodiment of the present invention;

FIG. 2A is a top view of an embodiment of to portion of the portable exhibit display of the present invention;

FIG. 2B is an exploded perspective view of the portion of the portable exhibit display illustrated in FIG. 2A;

FIG. 2C is a front elevation view of the portion of the portable exhibit display illustrated in FIG. 2A;

FIG. 2D is an exploded side elevational view of FIG. 2B;

FIG. 3A is a top view of an embodiment of an accessory portion of the portable exhibit display of the present invention;

FIG. 3B is an exploded perspective view of the accessory illustrated in FIG. 3A;

FIG. 3C is a front elevation view of the accessory illustrated in FIG. 3A;

FIG. 3D is an side elevation view the accessory illustrated in of FIG. 3A;

FIG. 7 is a front perspective view of an embodiment of multiple combined portable exhibit displays of the present invention; and FIG. 8 is a front perspective view of an embodiment of multiple combined portable exhibit displays of the present invention.

DETAILED DESCRIPTION

Figure 4:
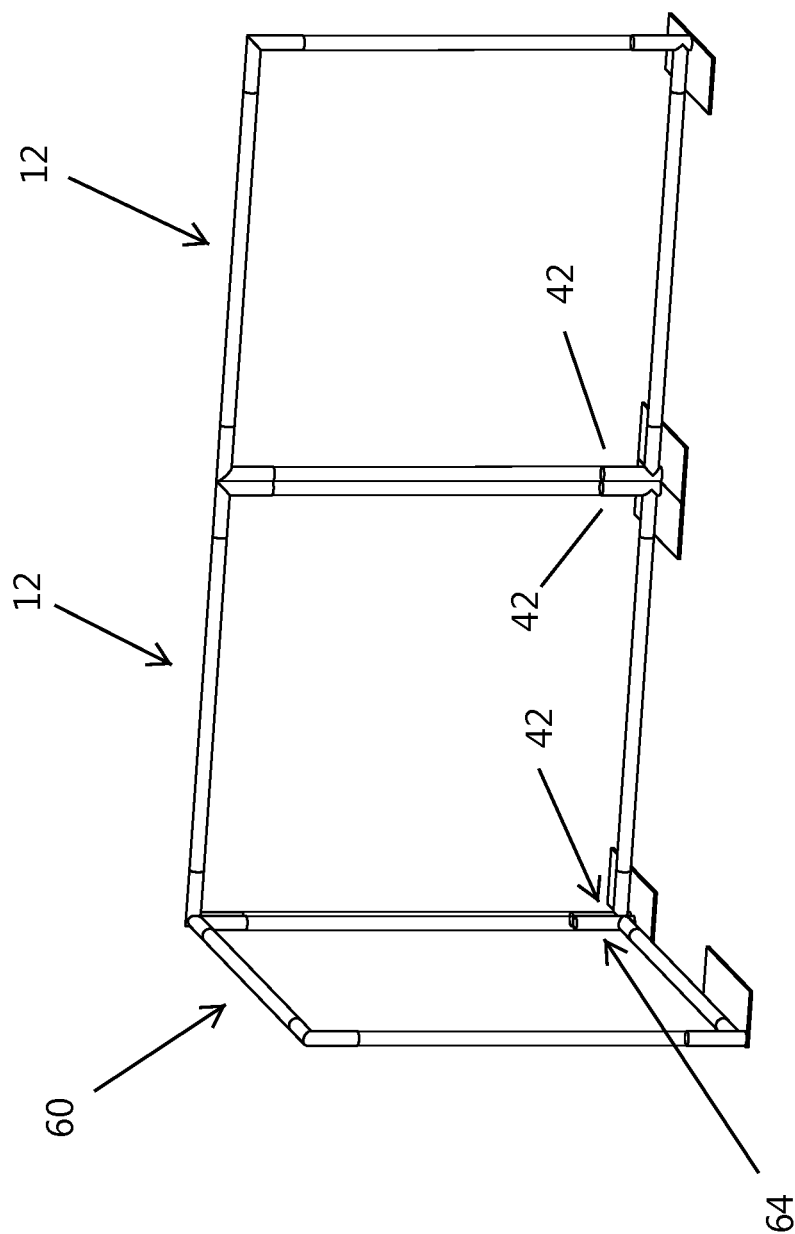
FIG. 4 is a front perspective view of an embodiment of multiple combined portable exhibit displays of the present invention.

The objects and advantages enumerated above together with other objects, features and advances represented by the present invention will now be presented in terms of detailed embodiments described with reference to the attached drawing figures, which are intended to be representative of various possible configurations of the invention. Other embodiments and aspects of the invention are recognized as being within the grasp of those having ordinary skill in the art.

Unless otherwise apparent or stated, directional references, such as "upper", "lower", "inner", "outer", "top", "bottom", "vertical", "horizontal", and the like are intended to be relative to the orientation of a particular embodiment of the invention as shown in the figures. In addition, a given reference numeral indicates the same or similar structure when it appears in different figures, and like reference numerals identify similar structural elements and/or features of the subject invention.

A portable exhibit display 10 of the present invention includes a frame 12 having a plurality of interconnectable frame members 14. In the illustrated embodiment, frame members 14 include upright members 14a and cross members 14b connecting between and/or among upright members 14a.

As shown in FIGS. 2A-2D, frame members 14 may include a tubular side wall 16 defining a chamber 18. While a variety of configurations for frame members 14 are contemplated by the present invention, substantially circular cross-section hollow tubular frame members 14 are most commonly utilized.

The portable exhibit display 10 illustrated in FIG. 1 includes a fabric covering 30 that is shown partially cut away to reveal frame 12. Fabric covering 30 may include a perimeter hem so as to drape over Frame 12 in a relationship of the frame supporting the fabric from within a pocket formed by the fabric. Alternative arrangements are also known in the art for securing a covering fabric to a display frame, including hook and loop-type fastening mechanisms, zippers, tie strings, and the like. Fabric covering 30 may preferably be tensioned to frame 12 to create a smooth display surface. Fabric covering 30 may be provided in one or more pieces or units for securement to frame 12 as desired. Fabric covering 30 may be formed from one or more of a variety of materials suitable for the intended use. Suitable fabrics include woven, non-woven, and laminated constructions of natural or artificial materials, as well as combinations thereof. A particular example is a polymer-based material suitable as a substrate for graphical printing processes. Example such polymer substrate materials include heavy-knit celtic cloth for dye sublimation, direct-type printing processes. Fabric covering 30 may exhibit a suitable degree of flexibility for the intended portable exhibit display.

It is also contemplated by the present invention that frame 12 may be covered for aesthetic purposes with distinct panels that may or may not include a fabric covering 30. Such display panels are well known in the art, and may be affixed to frame 12 through known securement means.

Frame members 14 of frame 12 may typically be fabricated from a lightweight metal such as aluminum, but may be otherwise manufactured from any suitable material or combination of materials. Frame members 14 preferably include an array of receptacles in the sidewalls and opening to respective chambers 18. In the illustrated embodiment, receptacles 20 may be openings that are sized to receive and frictionally engage a fitting 22. Accordingly, receptacle 20 may define an opening that is substantially equivalent to an exterior size of fitting 22, wherein fitting 22 is capable of being inserted into receptacle 20 in a manner so that an opening wall 21 defining receptacle 20 frictionally engages outer surface 24 of fitting 22 to securely retain fitting 22 thereat. In other embodiments, however, opening wall 21 may not frictionally retain fitting 22, or at least provide the sole or majority source of retention force for retaining fitting 22 at receptacle 20.

Fitting 22 includes first and second ends 26, 28 along a fitting axis 32, and a cavity 34 that opens to at least first end 26. When installed at receptacle 20, fitting 22 may be substantially contained in chamber 18.

Fitting 22 may be fabricated from any suitable material, and is configured for installation into receptacle 20 of frame member 14. In some embodiments, fitting 22 may be fabricated from a polymeric material, such as polyoxymethylene (POM) available from DuPont under the DELRIN® trade name.

An example set of dimensional parameters for the present invention includes frame members 14 having a substantially circular cross-section with an outer diameter $X_1$ of about 1.5 in. Outer diameter $X_2$ of a substantially circular cross-section fitting 22 may be about 1.25 in., and substantially equivalent to the opening diameter of receptacle 20. In this arrangement, first end wall 27 may have a width of 0.125 in., such that diameter $X_3$ of cavity 34 may be about 1 in. A depth dimension of cavity 34 is preferably appropriate to receive a first magnet 40 therein, and may be, for example, at least 0.5 in. Other dimensional arrangements for the components of the present invention are contemplated as being within the grasp of those having ordinary skill in the art.

First magnets 40 may be secured in respective cavities 34 of fittings 22 positioned at frame members 14 of frame 12. First magnets 40 may be received in respective cavities 34 so as to be substantially coextensive with first end wall 27. The plurality of first magnets 40 define magnetic attachment regions 42 of a magnetic attachment array about frame 12. First magnets 40 may be rare earth magnets configured for retention in respective cavities 34 of fittings 22. Example first magnets 40 are available from Applied Magnets under the trade name Neodymium magnets.

In some embodiments, first magnet 40 may be secured in respective cavities 34 by first attachment means, such as adhesives, fasteners, or the like. Moreover, fitting 22 may be secured in chamber 18 with a screw 50 that extends through an aperture 21 in frame member 14, so as to threadably engage with fitting 22. Other mechanisms for additionally or solely securing fitting 22 to frame member 14 are known in the art.

The magnetic attachment array of portable exhibit display 10 is useful for the removable securement of one or more accessories 60. As illustrated in FIGS. 3A-3D, an example accessory 60 includes a rear surface 62 with one or more attachment points 64. To magnetically engage with the magnetic attachment array of Frame 12, accessory 60 may include one or more attachment points 64 in the form of a metallic plate and/or a second magnet 66 adapted to be attracted to first magnets 40 of the magnetic attachment array. Accordingly, a polarity of second magnet 66 attracts first magnets 40, and vice versa, so that accessory 60 may be removably magnetically securable to portable exhibit display 10. In some embodiments, second magnets 66 are rare earth magnets available from Applied Magnets under the trade name Neodymium magnets. Attachment points 64, including second magnets 66, may be secured to accessory 60 in any conventional fashion so that the magnetic attraction between attachment point 64 and first magnets 40 retain accessory 60 at the portable exhibit display 10.

As shown in FIG. 1, accessories 60 may be removably magnetically securable to fabric covering 30 in proximity to respective magnetic attachment regions 42 at frame 12. Those of ordinary skill in the art will recognize that, while no attachment force may be exerted among fabric covering 30 and one or both of first or second magnets 40, 66, fabric covering 30 may be operably disposed between such first and second magnets 40, 66 and/or between first magnet 40 and attachment point 64 of accessory 60. Such an arrangement permits the magnetic securement of accessory 60 with portable exhibit display 10 at fabric covering 30, and particularly in proximity to respective magnetic attachment regions 42. The magnetic securement capability facilitates rapid and simple attachment and detachment of various accessories. The attractive force of at least first magnets 40 to respective attachment points 64 provide a "self-locating" function, in which accessory 60 is drawn by magnetic force to an appropriate mounting position wherein the respective attachment points 64 are in proximity to magnetic attachment regions 42 on frame 12. Such a self-locating function operates to correctly position and level accessories 60, in that the magnetic attachment regions 42 are provided in predetermined locations of frame 12 at specific spacings and locations to direct a desired magnetic securement of accessories 60.

It is contemplated that a variety of accessories may be utilized in the portable exhibit display of the present invention. Examples include shelves, graphical apparatus, pegboards, and the like. Applicant further contemplates that multiple walls or frames (see FIGS. 4, 5, 7, and 8) may be magnetically secured to frame 12 as an accessory 60. For example, a flange or end portion of a side wall may be provided with one or more attachment points 64 for magnetic interaction with magnetic attachment regions 42 of end upright members 14a of frame 12. In such a manner, multiple walls may be added as desired without the need for separate mechanical fasteners or apparatus (see, for example, FIG. 4).

Figure 5:
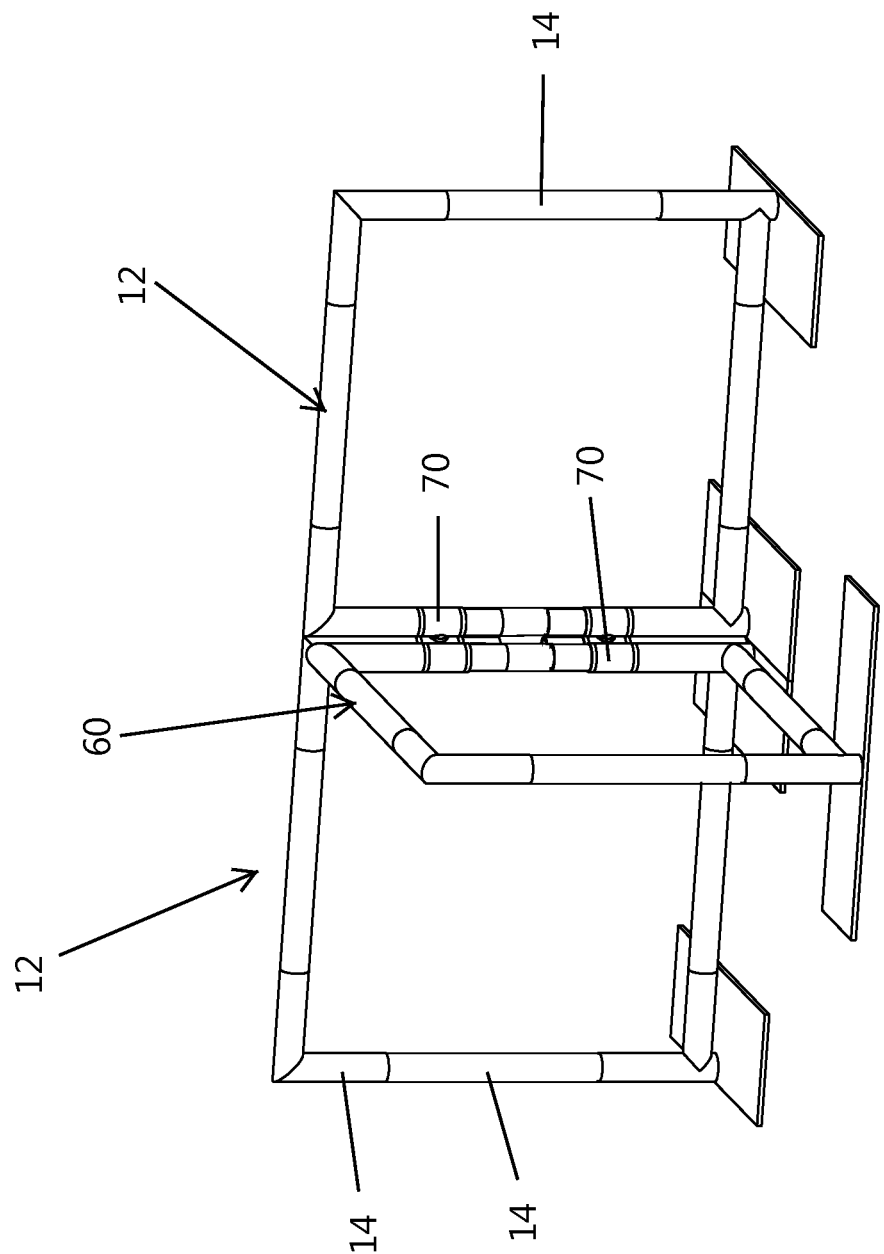
FIG. 5 is a front perspective view of an embodiment of multiple combined portable exhibit displays of the present invention.
Figure 6:
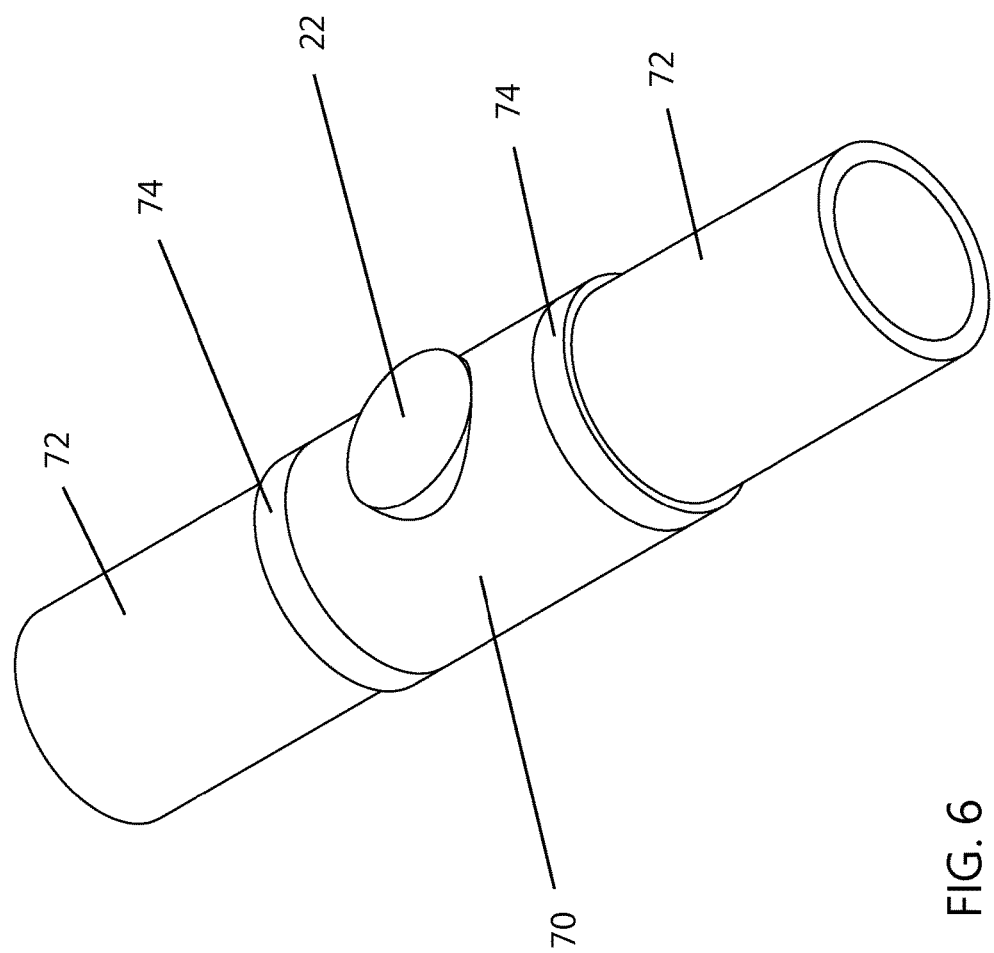
FIG. 6 is a perspective view of an embodiment of a portion of the portable exhibit display of the present invention.

With reference to FIGS. 5 and 6 multiple frames 12 are shown magnetically coupled together. Each frame 12 is comprised of frame members 14 that interconnect together with magnetic swivel fittings 70 (illustrated in FIG. 6). The swivel fittings 70 include opposing ends 72 having an outer diameter sized slightly smaller than an inner diameter of the hollow frame members 14. A shoulder 74 of the swivel fitting is sized to engage with an end of the frame member and stop the swivel from sliding completely into the hollow inner portion of the frame member. Each swivel includes a magnet 40. When multiple frames are aligned together, the swivels 70 may be rotated within the frame members such that the magnets of adjacent swivels are in alignment and magnetically couple together. Those skilled in the art will appreciate that the polarity of adjacent magnets are such that the magnets all together attract and provide a sufficient magnetization to couple and retain the frames together. As described above and as illustrated in FIGS. 7 and 8, the tubular frame members 14 of each frame 12 may have a circular cross-section or may be flattened to form a more rectangular cross-section. Further, those skilled in the art will appreciate that the shape of the magnetic fittings 22 may be modified to couple with the flat or rectangular tubing of the frame members. Also, angle brackets 78 may be utilized to secure the rectangular tubular frame members 14 together. Also, as an alternative, a slot 80 may be formed in the frame members and the magnets 22 may be fastened within the slots. Of course, other suitable attachments may be utilized to secure the magnetic fittings 22 to the frame members 14.

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

What is claimed is:

1. A portable exhibit display, comprising:
 a first frame having a plurality of interconnectable frame members, said frame members having hollow portions, said frame members further having an array of receptacles formed in said frame members and extending into the hollow portions of said frame members;
 a first fabric covering for tensioned securement to said first frame;
 a plurality of magnets secured in said receptacles of said frame members, wherein the magnets are secured such that an outer portion of the magnets are substantially coextensive with an outer surface of said frame members, wherein said plurality of magnets define magnetic attachment regions of said frame members of said first frame; and
 an accessory, said accessory being removably magnetically securable at said magnetic attachment regions of said first frame, wherein a portion of said fabric is sandwiched between said first frame and said accessory proximate said magnetic attachment regions.

2. The portable exhibit display as recited in claim 1 wherein said accessory has magnets that define a plurality of attachment points of said accessory.

3. The portable exhibit display as recited in claim 1 wherein said accessory is selected from the group consisting of a shelf, a graphical apparatus, a peg board, and a wall.

4. The portable exhibit display as recited in claim 1 wherein said magnets of said first frame are substantially contained within fittings, said fittings being attached to said frame members within said receptacles.

5. The portable exhibit display as recited in claim 1, wherein said accessory is comprised of a second frame having an array of receptacles and magnets defining corresponding magnetic attachment regions of said second frame and further including a second fabric covering that covers at least a portion of said second frame.

6. The portable exhibit display as recited in claim 1, wherein said magnets are comprised of magnetized fittings that align flush with an outer side of said first frame members.

7. The portable exhibit display as recited in claim 6, wherein said magnetized fittings define magnetic attachment regions along said first frame.

8. The portable exhibit display as recited in claim 6, wherein said accessory is comprised of a three dimensional accessory having attachment points consisting of at least one of a metallic plate and second magnetized fittings, wherein said attachment points are arranged on said accessory to align with said attachment regions of said first frame.

9. The portable exhibit display as recited in claim 8, wherein said first and second magnetized fittings having a sufficient magnetization to couple and retain said accessory to said first frame with the portion of fabric of the first frame between the accessory and first frame.

10. A portable exhibit display, comprising:
 a first frame having an array of magnets contained within corresponding receptacles of said first frame, wherein corresponding outer surfaces of said magnets are aligned flush with an outer surface of said first frame and said array of magnets defines a corresponding first magnetic attachment region, said first frame having a first fabric covering that covers at least a portion of the first magnetic attachment region, and wherein said first frame is comprised of interconnectable frame members;
 a second frame having an array of magnets contained within corresponding receptacles of said second frame, wherein corresponding surfaces of said magnets are aligned flush with an outer surface of said second frame and said array of magnets defines a corresponding second magnetic attachment region, said second frame having a second fabric covering that covers at least a portion of said second magnetic attachment region;
 wherein said second frame is removably magnetically securable to said first frame, and said first frame is removably magnetically securable to said second frame;
 wherein a portion of said first fabric covering and second fabric covering are sandwiched between said first frame and said second frame.

11. The portable exhibit display as recited in claim 10, wherein said second frame is comprised of interconnectable frame members.

12. The portable exhibit display as recited in claim 10, further including magnetized swivel fittings interconnecting at least two frame members of said first frame.

13. The portable exhibit display as recited in claim 11, further including magnetized swivel fittings interconnecting at least two frame members of said second frame.

14. The portable exhibit display as recited in claim 10, wherein said magnets of said first frame are comprised of magnetized fittings having an outer surface that aligns flush with an outer side of said first frame.

15. The portable exhibit display as recited in claim 10, wherein said magnets of said second frame are comprised of magnetized fittings having an outer surface that aligns flush with an outer side of said second frame.

16. The portable exhibit display as recited in claim 14, wherein said magnetized fittings having a sufficient magnetization to couple and retain said first frame to said second frame.

17. A portable exhibit display, comprising:
 a first frame having frame members interconnected with magnetized swivel fittings, said first frame further having an array of magnets contained within said first frame, wherein corresponding outer surfaces of said array of magnets are aligned flush with an outer surface of said first frame and said array of magnets defines a corresponding first magnetic attachment region;

a second frame having frame members interconnected with magnetized swivel fittings, said second frame further having an array of magnets contained within said second frame, wherein corresponding outer surfaces of said array of magnets are aligned flush with an outer surface of said second frame and said array of magnets defines a corresponding second magnetic attachment region;

wherein said second frame is removably magnetically securable to said first frame, and said first frame is removably magnetically securable to said second frame; and said first frame having a first fabric covering that covers at least a portion of the first magnetic attachment region, wherein a portion of said first fabric covering is sandwiched between said first frame and said second frame.

18. The portable exhibit display as recited in claim 17, said second frame having a second fabric covering that covers at least a portion of said second magnetic attachment region, wherein a portion of said second fabric covering is sandwiched between said first frame and said second frame.

* * * * *